Oct. 27, 1931.  C. C. HARRIS  1,829,090
SWIMMING FLOAT
Filed Oct. 13, 1930   2 Sheets-Sheet 1

Inventor
Carl C. Harris
By Attorneys

Oct. 27, 1931.  C. C. HARRIS  1,829,090
SWIMMING FLOAT
Filed Oct. 13, 1930   2 Sheets-Sheet 2

Inventor
Carl C. Harris
By Attorneys
Southgate Fay & Hanley

Patented Oct. 27, 1931

1,829,090

UNITED STATES PATENT OFFICE

CARL C. HARRIS, OF ORANGE, MASSACHUSETTS

SWIMMING FLOAT

Application filed October 13, 1930. Serial No. 488,205.

The principal object of this invention is to provide a float principally for use in swimming in which there is no necessity for having any straps for attaching it to the body and to provide it with means by which it will tend to remain in place under the body of the user, that is, means for keeping it from moving to one side or the other so that the swimmer can lie flat upon it and be confident that the float will remain in place.

The invention also involves the use of a frame surrounding a floating element consisting of cork pieces or the like and handles on the frame by which the swimmers can grasp it while it is floating in the water and by which it can be carried around and thrown out into the water when used as life preserver.

Other objects and advantages of the invention will appear hereinafter.

Reference is to be had to the accompanying drawings in which

Figure 1:
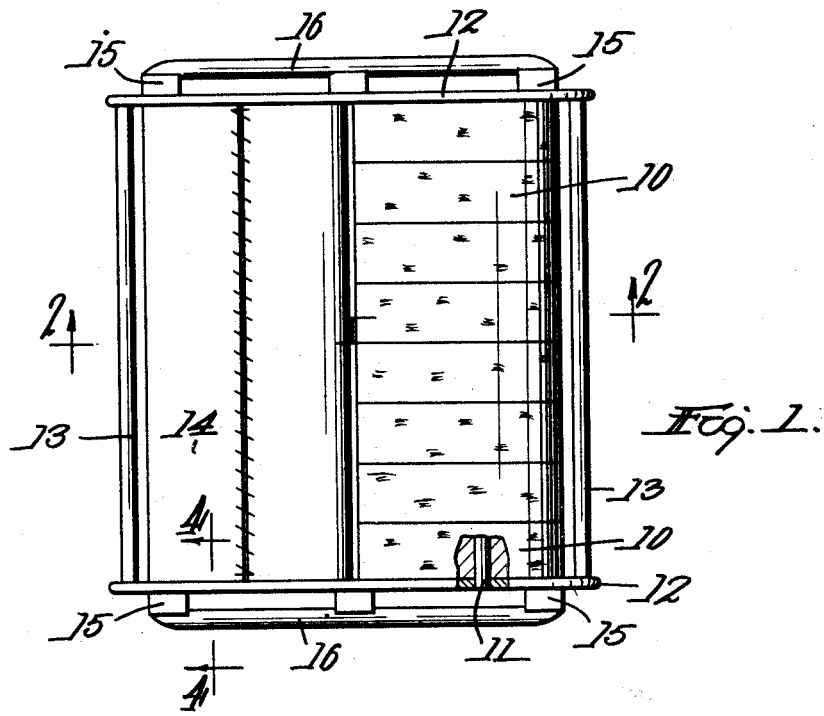
Fig. 1 is a plan of a preferred embodiment of the invention with part of the canvas covering removed to show the floating element.

This float is made up preferably of a series of blocks or strips 10 of cork or other buoyant material. They are assembled or strung on cross rods 11, preferably of wood, which extend through a series of them and are held at their ends by parallel side pieces 12. The strips of cork are rigidly supported therefore and it will be seen that they have on each side an inclined surface toward the center so that at the center the float is thinner than at the ends. The wooden pieces 12 are substantially the same shape projecting out at the ends enough to receive two end rods 13 spaced from the cork and adapted to further strengthen the frame and also to be used as handles. Each strip of cork is surrounded by a canvas covering 14. At the sides the side pieces 12 are provided with cleats 15 on which are secured another pair of handles 16 spaced from the sides.

The handles 13 and 16 have two functions. They are convenient for swimmers to grasp while the device is floating on the surface of the water and they constitute a very important improvement over the ordinary float or life preserver for that reason. They are also convenient for use in carrying the float when out of the water and for use in throwing it out into the water when used as a life preserver.

The shape of the device is rectangular and nearly square so that it has an important advantage as to storage space over ordinary life preservers. This is compact and has a maximum floating capacity for its size, but a particular advantage is the fact that when the swimmer lies on it, as indicated in dotted lines in Fig. 2, the upwardly projecting ends prevent its being dislodged from the body easily and the swimmer can feel safe about being dislodged from the float. It has no effective tendency to move out to one side. The device is reversible and will drain easily and dry out comparatively quickly when taken out of the water.

Figure 5:
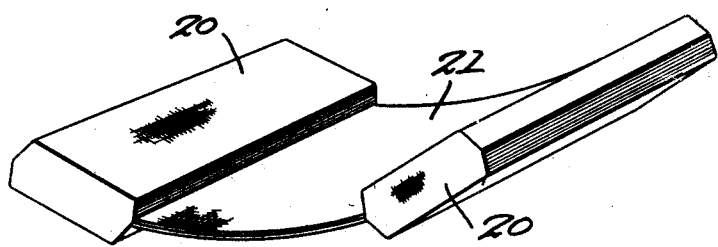
Figs. 5 and 6 are perspective views of other forms of the invention.
Figure 6:
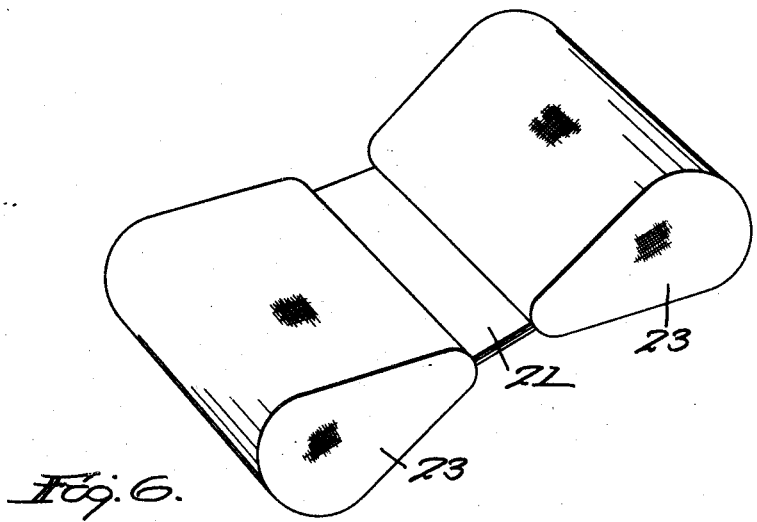

Many of the above remarks apply also to Figs. 5 and 6. In Fig. 5 the float is shown in a very simple form comprising two substantially rectangular blocks or strips 20 of cork or the like connected flexibly together by the sheet of canvas 21 which surrounds them. The canvas surrounds each strip of cork and the upper and lower layer are sewed together along a line near the edge of the cork. The space between the two cork strips is elongated and the canvas in that space constitutes a flexible rest for the body of the user. There is little or no tendency for the body to roll off the float.

Figure 2:
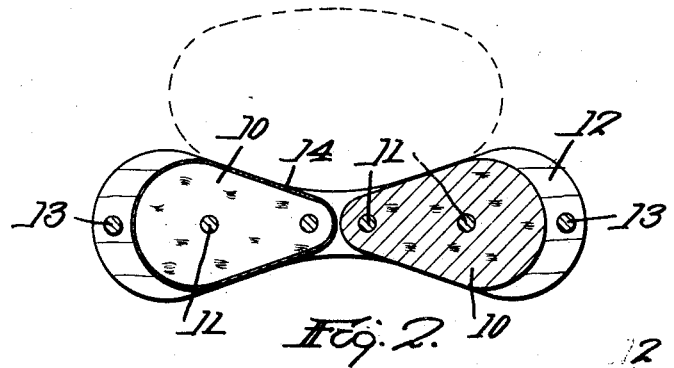
Fig. 2 is a sectional view on the line 2—2 of Fig. 1.
Figure 3:
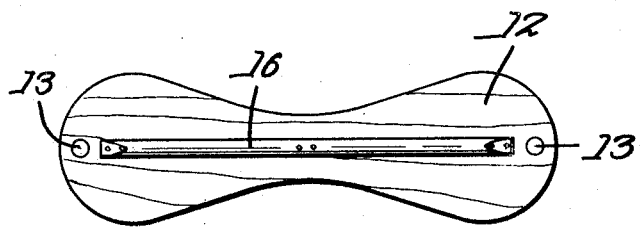
Fig. 3 is an end elevation.
Figure 4:
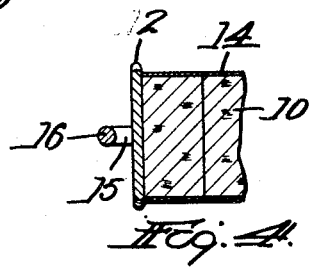
Fig. 4 is a sectional view on the line 4—4 of Fig. 1.

In Fig. 6 the situation is similar but the cork strips 23 are triangular with rounded edges and the advantages of both Fig. 2 and Fig. 5 are present.

Although I have illustrated and described only one form of the invention I am aware of the fact that modifications can be made therein by any person skilled in the art without departing from the scope of the invention as expressed in the claims. Therefore I do not wish to be limited in this respect, but what I do claim is:—

1. As an article of manufacture, a float and life preserver comprising a series of blocks of light material, rods passing through the series on which the blocks are secured firmly in position, a pair of side pieces to which these rods are secured at their ends and a handle spaced from the float and parallel with one edge thereof.

2. As an article of manufacture, a float or life preserver comprising two sets of light blocks, rods on which said blocks are strung and a pair of side pieces to which the ends of the rods are secured, said blocks being of a general triangular form with the apexes of the triangles adjacent to each other, whereby the ends of the float are thicker than its center, for the purpose described.

3. As an article of manufacture, a float or life preserver comprising a pair of side pieces having a greater width at their ends than at the center, rods secured at their ends to the two side pieces and blocks made of light material strung on the rods between the side pieces and together having a general shape similar to that of the side pieces, whereby the float is high at the ends and depressed at the center.

4. A float or life preserver comprising a pair of side pieces spaced apart, rods fixed to the side pieces and extending from one to the other, and blocks of cork strung on the rods and extending from one side piece to the other, the side pieces and assembly of the corks being wide at the ends and narrow at the center for the purpose described.

5. A float or life preserver consisting of a pair of side pieces and two sets of blocks of cork mounted between them, the side pieces being depressed at the center and the sets of corks also depressed at the center from one side piece to the other, each set of corks being provided with a canvas cover surrounding it, a pair of rods extending from one side piece to the other beyond the corks to serve as handles and a pair of handles supported by the side pieces and spaced from them.

6. A float or life preserver comprising a pair of side pieces spaced apart, and blocks of cork extending from one side piece to the other, the side pieces and entire body of the corks being wide at the ends and narrow at the center for the purpose described.

7. As an article of manufacture, a float or life preserver comprising two sets of light blocks, secured between the side pieces, and a pair of side pieces, said blocks being of a general triangular form with the apexes of the triangles adjacent to each other, whereby the ends of the float are thicker than its center, for the purpose described.

8. A float or life preserver comprising two buoyant members at opposite sides each of a general permanently triangular shape with the apexes extending toward the center of the float and flexible means between them for connecting them together.

9. A float or life preserver comprising two side pieces, means for connecting them rigidly together, rigid handles supported by and extending along said side pieces and spaced therefrom, and rigid handles at the ends of the float and spaced from said ends.

In testimony whereof I have hereunto affixed my signature.

CARL C. HARRIS.